United States Patent [19]

Gruner et al.

[11] Patent Number: 4,514,800
[45] Date of Patent: Apr. 30, 1985

[54] DIGITAL COMPUTER SYSTEM INCLUDING APPARATUS FOR RESOLVING NAMES REPRESENTING DATA ITEMS AND CAPABLE OF EXECUTING INSTRUCTIONS BELONGING TO GENERAL INSTRUCTION SETS

[75] Inventors: Ronald H. Gruner, Cary, N.C.; Gerald F. Clancy, Saratoga, Calif.; Craig J. Mundie, Cary, N.C.; Steven J. Wallach, Saratoga, Calif.; Stephen I. Schleimer, Chapel Hill; Walter A. Wallach, Jr., Raleigh, both of N.C.; John K. Ahlstrom, Mountain View, Calif.; David H. Bernstein, Ashland, Mass.; Michael S. Richmond, Pittsboro, N.C.; David A. Farber, Durham, N.C.; John F. Pilat, Raleigh, N.C.; Richard A. Belgard, Saratoga, Calif.; Richard G. Bratt, Wayland, Mass.

[73] Assignee: Data General Corporation, Westboro, Mass.

[21] Appl. No.: 266,525

[22] Filed: May 22, 1981

[51] Int. Cl.³ .................... G06F 9/16; G06F 13/00
[52] U.S. Cl. .................................................. 364/200
[58] Field of Search ............................. 364/200, 900

[56] References Cited

U.S. PATENT DOCUMENTS

| | | | |
|---|---|---|---|
| 3,805,247 | 4/1974 | Zucker et al. | 364/200 |
| 3,905,023 | 9/1975 | Perpiglia | 364/200 |
| 3,983,541 | 9/1976 | Faber et al. | 364/200 |
| 4,024,508 | 5/1977 | Bachman et al. | 364/200 |
| 4,177,510 | 12/1979 | Appell et al. | 364/20 |

Primary Examiner—Gareth D. Shaw
Assistant Examiner—Daniel K. Dorsey
Attorney, Agent, or Firm—Robert F. O'Connell

[57] ABSTRACT

A digital computer system including a memory and a processor. The memory operates in response to memory commands received from the processor. Items of data stored in the memory include instructions to which the processor responds. Each instruction contains an operation code which belongs to one of several sets of operation codes. The meaning of a given operation code is determined by the operation code set to which the instruction belongs. Some of the instructions also contain names representing items of data used in the operation specified by the operation code. The processor includes an operation code decoding system which decodes the operation code as required for the instruction set to which it belongs, a name resolution system for deriving the address of the data item represented by a name from the name using an architectural base address contained in the name resolution system, and a control system which controls the operation of the processor. The processor performs a call operation and a return operation. Only the call operation and the return operation may change the current architectural base address. The memory further contains name table entries associated with the names. Each name table entry contains information used by the name resolution system when it resolves a name.

14 Claims, 1 Drawing Figure

DIGITAL COMPUTER SYSTEM INCLUDING APPARATUS FOR RESOLVING NAMES REPRESENTING DATA ITEMS AND CAPABLE OF EXECUTING INSTRUCTIONS BELONGING TO GENERAL INSTRUCTION SETS

CROSS REFERENCE TO RELATED APPLICATIONS

The present patent application is related to other patent applications assigned to the assignee of the present application.

Of those patent applications, the ones most closely related to the present application are Ser. Nos.:

266,426 Digital Data Processing System Incorporation Object-based Addressing and Capable of Executing Instructions Belonging to Several Instruction Sets, 266,533 Digital Data Processing System Incorporating Apparatus for Resolving Names, 266,521 Digital Computer System Having Unique Means of Referring to Operands and Ability to Execute a Plurality of Internal Languages, 266,423 Digital Data Processing System for Executing Instructions Containing Operation Codes Belonging to a Plurality of Operation Code Sets and Names Corresponding to Name Table Entries, all filed May 22, 1981.

BACKGROUND OF THE INVENTION

1. Field of the Invention

The present invention relates to digital computer systems and more specifically to digital computer systems capable of executing instructions belonging to several instruction sets and to digital computer systems which include a name resolution system for resolving names representing data.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, and 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing systems's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to digital computer systems capable of executing instructions belonging to several instruction sets and including name a name resolution system for resolving names representing data.

The digital computer system of the present invention includes a memory and a processor. The memory stores data items received from the processor and outputs stored items to the processor in response to memory commands received from the processor. Among the items of data are instructions. The processor performs operations and produces memory commands in response to the instructions. In the present invention, each instruction contains an operation code which belongs to one of several sets of operation codes. The meaning of a given operation code is determined by the operation code set to which the instruction belongs. Some of the instructions also contain names representing items of data used in the operation specified by the operation code. Each instruction is contained in a sequence of instructions, and the processor responds to the instruction while executing the sequence to which it belongs.

The processor includes an operation code decoding system which decodes the operation code as required for the instruction set to which it belongs, a name resolution system for deriving the address of the data item represented by a name from the name using an architectural base address contained in the name resolution system, and a control system which controls the operation of the processor in response to the operation code decoding system and the name resolution system. Among the operations performed by the processor are a call operation which suspends a current execution of a sequence of instructions and commences a new execution of a sequence and a return operation which terminates the current execution and resumes the execution which was suspended to commence the terminated execution. Only the call operation and the return operation may change the current architectural base address.

It is thus an object of the invention to provide an improved digital computer system.

It is a further object of the invention to provide a digital computer system capable of decoding instructions belonging to several instruction sets and resolving names representing data items.

It is another object of the invention to provide a digital computer system in which address calculation is performed using an architectural base register which is changed only by call operations and return operations.

Other objects, advantages and features of the present invention will be understood by those of ordinary skill in the art, after referring to the following detailed description of the preferred embodiments and drawings wherein:

Figure 1:
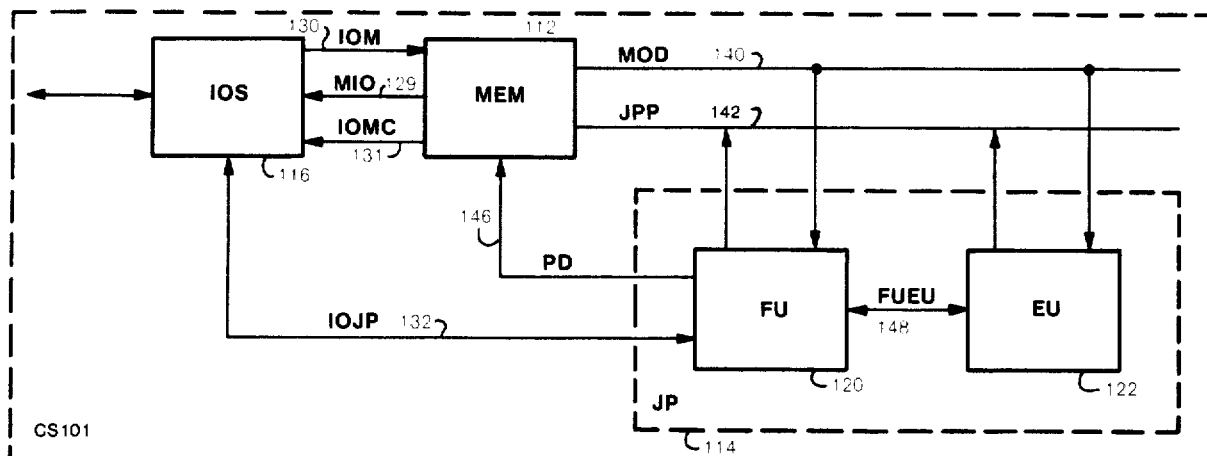
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

More particularly, attention is directed to FIGS. 3, 6, 9, 101, 212, 270, 303-307, 404-440, and 468-471 of the drawings in application Ser. No. 266,402, and to that part of the descriptive portion of the specification, particularly at pages 50, 66-69, 122-124, 450-475, 717-754, 767-900, 1028-1032, 1037-1039, 1047-1049 and 1056-1057 thereof, which relate to the subject matter of the claims herein.

We claim:

1. A digital computer system comprising:
   (1) memory means for performing memory operations including storing and providing data items in response to memory commands including addresses of said data items, said data items including
   (A) instructions, each said instruction containing
   (i) an operation code of a plurality of said operation codes, each said operation code specifying an operation of a plurality of operations performed by said digital computer system, and each said operation code belonging to one of a plurality of different operation code sets, the operation codes in a given operation code set being definable solely with reference to said given operation code set, and selected ones of said instructions further containing
   (ii) a name representing an item of data to be used in the operation specified by the operation code in said selected instruction, and
   (B) sequences of said instructions; and
   (2) processor means connected to said memory means for performing the operations performed by said system and providing memory commands to said memory means in response to said instructions, said processor means including
   (A) operation code decoding means for decoding the operation code in an instruction received in said processor as required by the operation code set to which the operation code in said received instruction belongs,
   (B) name resolution means for receiving the name in said received instruction and for deriving the address for the item of data represented by said received name using a current architectural base address, and
   (C) control means responsive to said operation code decoding means and to said name resolution means for controlling the operation of said processor means and for providing said memory command including the address provided by said name resolution means to said memory means,
   and wherein
   the operation performed by said system include
   (A) a call operation which suspends the execution of the current sequence of instructions by said processor means and begins the execution of another sequence of instructions, and
   (B) a return operation which terminates the execution of said another sequence of instructions and resumes said suspended execution, and a currently used architectural base address can only be changed as a result of said call operations and said return operations.

2. In the digital computer system of claim 1, and further wherein:
all the instructions contained in each sequence thereof contain operation codes belonging to only one operation code set of said plurality of operation code sets.

3. In the digital computer system of claim 2, and further wherein:
each sequence of instructions has associated with it an operation code set identifier of data items identifying the operation code set to which the operation codes in the instructions of said sequence belong; and
said operation code decoding means responds to the operation code in said received instruction and to the operation code set identifier associated with the sequence of instructions containing said received instruction for decoding said operation code as required by the operation code set to which said operation code belongs.

4. In the digital computer system of claim 3, and further wherein:
said operation code decoding means responds to a representation of the operation code set identifier associated with the sequence currently being executed by said processor means;
said representation can only be changed as a result of said call and return operations; and
said operation code decoding means decodes said operation codes using said representation.

5. In the digital computer system of claim 1, and further wherein:
said name resolution means includes a plurality of architectural base addresses; and
said architectural base addresses can only be changed as a result of said call operations and said return operations.

6. In the digital computer system of claim 5, and further wherein:
said data items further include a plurality of process items, each process item containing data items associated with the executions of selected procedures, each process item including
(a) at least one frame of said items, each frame corresponding to the execution of one of said selected procedures, and
(b) a static data area of data items associated with at least the execution of one of said selected procedures; and
said architectural base addresses include
(a) a frame address specifying the frame corresponding to the current execution,
(b) a static data address specifying said static data area associated with said current execution, and
(c) a procedure base address specifying the instruction sequence whose instructions are being executed in said current execution.

7. In the digital data processing system of claim 1, and further wherein:
all of said instructions have common formats.

8. In the digital data processing system of claim 7, and further wherein:
said processor means further includes parsing means for receiving instructions and for providing operation codes to said operation code decoding means and names to said name resolution means.

9. In the digital data processing system of claim 7, and further wherein:
all operation codes have a first fixed size;
all names in one instruction sequence have a second size;
each said sequence has associated with it a syllable size; of data items specifying said second size of said names in said sequence; and
said processor means further includes parsing means responsive to said syllable size for receiving said instructions and for providing said operation codes to said operation code decoding means and said names to said name resolution means.

10. In the digital computer system of claim 1, and further wherein:
each name permanently corresponds to a name table entry of said data items, each name table entry including information from which the address of the item of data represented by the name corresponding to said name table entry is to be derived; and
said name resolution means further employs the information in the name table entry associated with said received name together with said architectural base address to derive the address for the item of data represented by said received name.

11. In the digital computer system of claim 10, and further wherein:
each sequence of instructions is
permanently associated with a name table of said data items, said name table containing name table entries corresponding to the names contained in said selected instructions in the sequence associated with said name table;
said name resolution means further includes a current name table address specifying the name table associated with the instruction sequence currently being executed and locates the name table entry corresponding to said received name by means of said received name and said current name table address; and
said current name table address can only be changed as a result of said call operations and said return operations.

12. In the digital computer system of claim 10, and further wherein: said name resolution means includes a plurality of said architectural base addresses;
each of said name table entries contains
(a) a base specifier for specifying how a base address of said addresses is to be derived using said architectural base addresses and
(b) a displacement specifier from which a displacement value may be derived; and further wherein
said name resolution means derives the address of said represented item by deriving a base address as specified by said base specifier and a displacement as specified by said displacement specifier and by adding said displacement to said base address; and
said architectural base addresses can only be changed as a result of said call operations and said return operations.

13. In the digital computer system of claim 12, and further wherein:
each of said sequences of instructions is permanently associated with a name table of data items, said name table containing name table entries corresponding to names contained in certain instructions in the sequence of instructions associated with said name table;

said name resolution means further includes a current name table address of said addresses specifying the name table associated with the sequence of instructions currently being executed and locates the name table entry corresponding to said received name by means of said received name and said current name table address; and said current name table address can only be changed as a result of said call operations and said return operations.

14. In the digital computer system of claim 12, and further wherein:

said data items further include a plurality of process items, each of said process items containing data items associated with the executions of certain procedures, each one of said process items including (a) at least one frame of said process items, each of said frames corresponding to one execution of said certain procedures, and (b) a static data area of said process items associated with at least one execution of said certain procedures; and said plurality of current architectural base addresses includes (a) a frame address to which said displacement values are added to specify locations in the frame corresponding to said current execution, (b) a static data address to which said displacement values are added to specify locations in said static data area associated with said current execution, and (c) a procedure base address to which said displacement values are added to specify locations in the procedure whose instructions are being executed in said current execution.

* * * * *